United States Patent [19]

Schneider et al.

[11] Patent Number: 5,671,313
[45] Date of Patent: Sep. 23, 1997

[54] OPTICAL CABLE AND METHOD FOR THE MANUFACTURE THEREOF

[75] Inventors: Reiner Schneider, Ebersdorf; Ernst Opel, Neustadt; Edgar Heinz, Steinach, all of Germany

[73] Assignee: Siemens Aktiengesellschaft, Munich, Germany

[21] Appl. No.: 371,204

[22] Filed: Jan. 11, 1995

[30] Foreign Application Priority Data

Jan. 12, 1994 [DE] Germany ............................ 44 00 700.0
Nov. 17, 1994 [DE] Germany ............................ 44 40 983.4

[51] Int. Cl.$^6$ ...................................................... G02B 6/44
[52] U.S. Cl. ........................ 385/110; 385/106; 385/114
[58] Field of Search .................................... 385/110, 105, 385/100, 103, 104, 106, 114

[56] References Cited

U.S. PATENT DOCUMENTS

| 4,401,366 | 8/1983 | Hope | 385/110 |
|---|---|---|---|
| 4,906,067 | 3/1990 | Mayr et al. | 350/96.23 |
| 5,210,813 | 5/1993 | Oestreich et al. | 385/114 |
| 5,212,756 | 5/1993 | Eoll | 385/114 |
| 5,310,510 | 5/1994 | Pascher | 385/105 |
| 5,420,955 | 5/1995 | Cooke et al. | 385/110 |

FOREIGN PATENT DOCUMENTS

| 0 503 433 A1 | 9/1992 | European Pat. Off. | 385/105 |
|---|---|---|---|
| 38 39 109 A1 | 5/1990 | Germany | 385/105 |
| 38 39 109 C2 | 5/1993 | Germany | 385/105 |
| 42 35 009 | 4/1994 | Germany | 385/110 |
| 2 040 063 | 8/1980 | United Kingdom | 385/105 |
| 2 157 018 | 10/1985 | United Kingdom | 385/110 |

OTHER PUBLICATIONS

Patent Abstract of Japanese Patent 52-24106 of Sep. 3, 1993, *Patent Abstracts of Japan*, vol. 17, No. 669, p. 1657, Dec. 9, 1993.

*Primary Examiner*—Phan T. H. Palmer
*Attorney, Agent, or Firm*—Hill, Steadman & Simpson

[57] ABSTRACT

A chamber element for an optical cable includes an opening for waveguides, which opening is defined by a chamber floor and two legs extending therefrom. The legs are shaped so that a resultant radial force proceeds inside the cross section of the legs as the force is directed toward a center axis of the cable.

47 Claims, 5 Drawing Sheets

OPTICAL CABLE AND METHOD FOR THE MANUFACTURE THEREOF

BACKGROUND OF THE INVENTION

The present invention is directed to an optical cable having at least one elongated chamber element with a chamber for the acceptance of light waveguides, which element is not fashioned sector-shaped in cross section and whose chamber is laterally limited by legs.

German Patent 38 38 109 discloses an optical cable wherein respective chamber elements comprise rectangular receptacle chambers. The outside walls of the respective chamber elements are constructed radially and proceed only in an inner region adjoining the base or floor of the chamber so that the neighboring chamber elements respectively abut adjacent to the base of the chambers. A compact cable structure is enabled as a result of this structure. Given a traditional design of such a chamber element, however, there is a risk that the sidewalls may potentially be bent inward toward the chamber, for example due to potentially occurring radial stresses. This can lead to an inadmissible deterioration of the light waveguide properties for any light waveguides disposed in the chamber.

SUMMARY OF THE INVENTION

The present invention is directed to an object of providing an optical cable having individual chamber elements, whose strength can be reliably improved individually and/or in the stranded union in a simple way.

These objects are accomplished in an improvement in an optical cable having at least one elongated chamber element with a chamber for the acceptance of light waveguides, which chamber element is not fashioned sector-shaped in cross section and whose chamber is laterally limited by legs. The improvement is that the structure of the legs is selected so that a resultant radial force acting on a respective leg proceeds essentially within the cross section of the leg in its imaginary extension toward the cable axis.

In that the resultant radial force potentially engaging on the respective leg of the chamber element proceeds essentially inside the cross section of the leg in its imaginary extension, the legs or, respectively, webs of the respective chamber elements remain largely torque-free. A lateral bending of the outer ends of each of the legs inward toward the chamber of the chamber element is, thus, largely avoided so that the chamber elements remain basically shape-stable. The chamber space itself and the light waveguides potentially placed therein thus also remain largely free of external forces.

The invention is also directed to a method for applying or manufacturing an optical cable that is characterized in that a resultant radial force acting on the respective leg is deflected essentially inside the leg cross section along its imaginary extension to the cable axis.

Other advantages and features of the invention will be readily apparent from the following description of the preferred embodiments, the drawings and claims.

DESCRIPTION OF THE PREFERRED EMBODIMENTS

Figure 1:
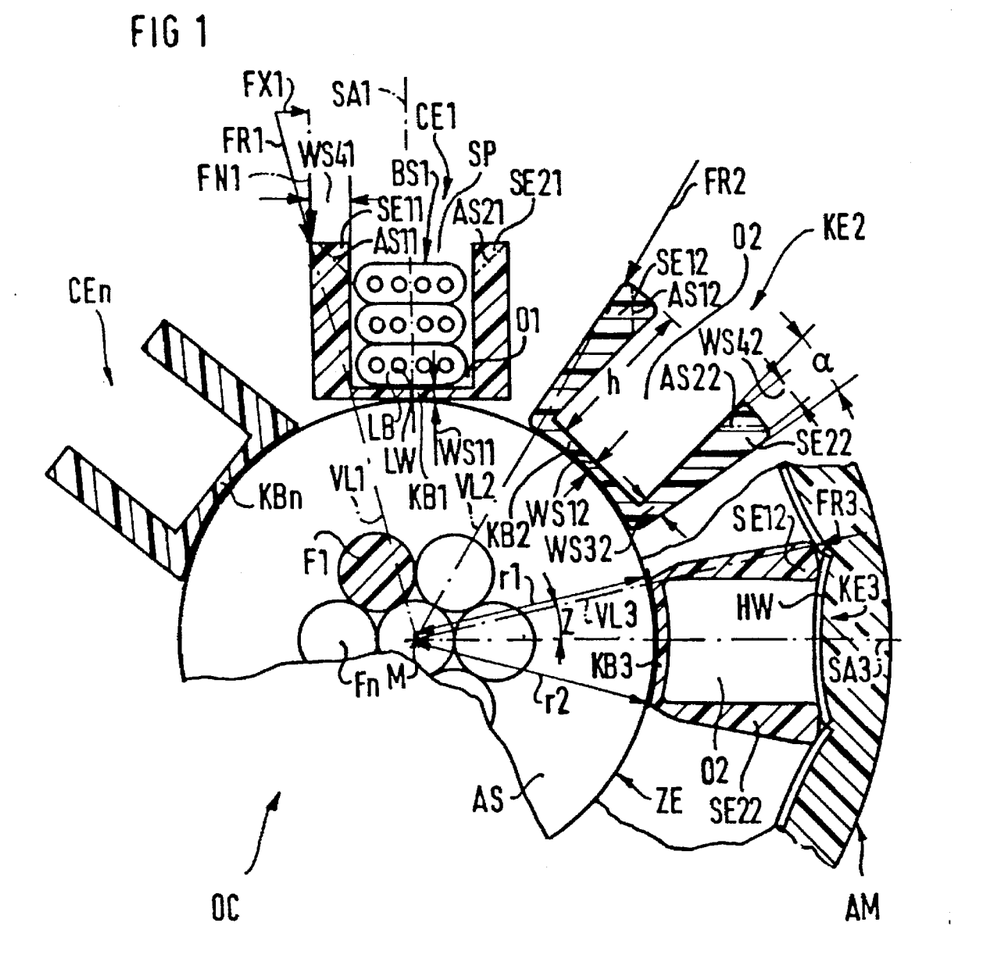
FIG. 1 is a partial schematic cross sectional view of a first exemplary embodiment of an optical cable of the present invention having different shapes of inventive chamber elements.

The principles of the present invention are particularly useful when incorporated in an optical cable, generally indicated at OC in FIG. 1. The optical cable OC includes a circular central element, generally indicated at ZE. The element ZE, for example, includes tensile and/or crush-resistant elements F1-Fn which may be steel or aramide fiber and are provided in the center thereof as a core in order to make the optical cable OC insensitive to tensile and crushing strains, preferably in the longitudinal direction of the cable. The tensile elements F1-Fn are preferably surrounded with a plastic thickening layer AS that is extruded thereon. This thickening layer is dimensioned so that the diameter of the circular-cylindrical central element ZE is adequate in order to arrange a desired plurality of chamber elements annulary around the thickening layer AS in at least one stranded ply. Expediently, a plastic material such as, for example, MDPE (medium density polyethylene) or LLDPE (linear load density polyethylene) is employed for the thickening layer AS. Viewed overall, thus, the central element ZE forms a foundation for the chamber elements that are directly arranged on the central element ZE, this foundation being largely resistant to transverse pressure in the transverse direction of the cable. As warranted, the central element ZE can also be entirely extruded of a plastic, preferably as a tensile plastic rope (see, for example, FIG. 5).

As viewed in longitudinal direction, n individual, elongated chamber elements CE1 through CEn are stranded onto the circular-cylindrical central element ZE of FIG. 1 in a helical fashion, so that an annular stranded ply having n chamber elements CE1 through CEn occurs on the outside circumference of the central element ZE as viewed in cross section. A vertical employable transmission element is formed in this way. As warranted, the central element ZE in the cable core can also be omitted. Thus, for example, such a transmission element of the invention can also be formed by a chamber element such as, for example, CE1 that is surrounded by an outside plastic cladding (see, for example, FIG. 8). Only the two chamber elements CE1 and CEn are shown in the cross sectional view of FIG. 1, whereas the remaining chamber elements CE2 through CEn-1 have been omitted for the sake of clarity. The latter are constructed and arranged in a fashion analogous to the two illustrated chamber elements CE1, CEn.

In cross section, the chamber element CE1 comprises a U-shaped profile, for example a profile which is not of a larger sector shape and, particularly, is not of a circular sector shape. In other words, this means that the two legs SE11 and SE21 of the element CE2 extend approximately perpendicularly relative to the planar chamber floor KB1 of the element. The inside walls laterally limit a radially outwardly open, approximately rectangular chamber O1. The chamber floor KB1 comprises an approximately straight line bottom or under surface as viewed in cross section and comprises an upper surface that proceeds approximately essentially parallel to the bottom surface. The floor or base KB1 comprises a wall thickness of identical size along its overall extent continuously between the two legs that laterally limit it. The bottom surface of the chamber floor KB1 approximately forms a tangent on the outside circumference of the central element ZE at that seating point at which the middle of the chamber floor KB1 is seated on the central element ZE. The inside walls of the two legs SE11 and SE21 in the exemplary embodiment of FIG. 1 thus do not proceed radially with respect to the cable axis M of the optical cable OC but proceed essentially continuously vertically, i.e. perpendicularly relative to the chamber base or, respectively, floor KB1. In their imaginary extension, the walls of the legs SE11 and SE21 thus form two circular secants (as in the case of profile elements that are shaped like a circular sector) within the limb defined by the outside circumference of the central element ZE that proceed parallel to one another and do not intersect the cable axis M. The outside walls of the legs SE11 and SE21 proceed parallel to their inside walls, so that the legs SE11 and SE21 have a respectively essentially rectangular shape when viewed in cross section and comprise a constant wall thickness WS41 over their full leg length. Viewed overall, an axially symmetrical, U-shaped chamber element CE1 with respect to the middle axis of the chamber O1 extending in a radial direction thus occurs and is illustrated in FIG. 1 by a dot-dashed symmetry line SA1 that, in the aligned condition of the chamber element CE1, extends in a radial direction with reference to the cable axis M. Viewed in cross section, the chamber element CE1 is thus fashioned with a U-profile and not like a circular sector, i.e. its two outside walls do not radially converge in a common intersection on the cable axis M.

An approximately rectangular light waveguide ribbon stack BS1 is placed into the chamber O1. The chamber width thus roughly corresponds to the cross sectional width of the ribbon stack in order to positionally secure the ribbon stack BS1 in a circumferential direction. The ribbon stack BS1 is formed by one or more light waveguide ribbons LB stacked on top of one another, whereby only three light waveguide ribbons are schematically illustrated in FIG. 1 for the sake of clarity. In cross section, the respective light waveguide ribbon LB comprises an approximately rectangular, outer plastic envelope which has at least one, and preferably a plurality of light waveguides LW embedded therein.

In order to protect the respectively introduced light waveguide ribbon stack BS1 from inadmissible, external mechanical stresses, the chamber depth is preferably selected greater than the height of the ribbon stack. In the chamber element CE1 of FIG. 1, the ribbon stack BS1 has both legs or, respectively, webs of the U-profiled chamber element CE1 projecting beyond it, so that a clearance or gap SP remains toward the outside. Given potentially occurring, mechanical stresses, the chamber element CE1 can be crushed or, respectively, compressed by this clearance SP before the uppermost light waveguide ribbon of the ribbon stack BS1 is mechanically stressed or contacted.

As viewed in circumferential direction, the legs SE11, SE21 of the chamber element CE1 of FIG. 1 comprise a wall thickness WS41 that is at least equal to but preferably greater than a wall thickness WS11 of the chamber floor KB1. Expediently, the legs SE11, SE21 comprise a wall thickness WS41 that is 1.0 through 2.5 times the thickness WS11 and preferably 1.1 through 2 times the thickness of the chamber floor KB1. In particular, the wall thickness WS41 of the legs SE11, SE21 is dimensioned between 0.45 and 0.8 mm; the wall thickness WS11 of the chamber floor KB1 is particularly dimensioned between 0.35 and 0.6 mm. This is particularly true, for example, for a chamber element of PC (polycarbonate) having a modulus of elasticity of approximately 2000N/mm given a chamber height as well as chamber width respectively between approximately 3 mm and 5 mm.

The wall thickness WS41 of the legs SE11 through SE21 is preferably dimensioned so that a resultant radial force attacking at the outer end of the respective leg proceeds essentially within the cross section of the leg in its imaginary extension toward the cable axis M. What is thereby understood by "resultant radial force" in this context is the vectorial sum of all potentially radially attacking force components in a specific point of attack. The resultant radial force is thus potentially composed of a plurality of radially attacking, individual forces. For example, these can be pressing forces created by the application of a retaining helix from the outside with which the respective chamber element is retained in its position on the central element, particularly stranding forces in the stranding process or other transverse pressing forces during cable manufacture as well as cable employment that thus act radially inwardly transversely relative to the cable axis M.

In FIG. 1, a force FR1 attacks at the outer, face end of the leg SE11 in the region of the leg edge or, respectively, corner thereof facing away from the chamber O1. The imaginary, preferably straight-line extension of this resultant radial force FR1 toward the cable axis M is indicated by a dot-dashed line VL1 which optimally proceeds over the entire length of the leg within the cross section thereof. In a circumferential direction toward the chamber O1, the introduced radial force FR1 comprises a force component FX1. This force component FX1, which attacks or is divided perpendicularly relative to the longitudinal extent of the leg SE11, is thus directed into the inside of the chamber O1 toward the symmetry line SA1 thereof and thus attempts to press the outer end of the leg SE11 into the chamber space O1, i.e. to produce a torque that bends the outer end of the leg SE11 into the chamber O1. In the example of FIG. 1, this torque that reduces the size of the chamber O1 has a leg lever arm allocated to it in a first approximation whose course essentially follows a leg diagonal from the left, outer leg corner (point of attack for the force FR1) to the middle of the leg foot at the chamber bottom KB1. However, as long as the radial force FR1 proceeds essentially inside the cross section of the leg in its imaginary extension toward the cable axis M, a force component FN 1 of the radial force FR1 is also simultaneously effective on the leg SE11 that is inwardly directed in longitudinal direction of the leg SE11 perpendicularly relative to the force component FX1 and attempts to make the chamber space O1 smaller. The force component FN1 produces a counter-torque (counter clockwise) on the leg SE11 opposite the torque produced by the force component FX1 in clockwise direction. The compensation effect of the counter-torque produced by the force FN1 relative to the torque exerted by the force FX1 becomes all the greater the broader, for example, the leg SE11 is, i.e. the more obliquely the respective connecting line between outer leg edge and middle of the leg foot point is selected (with reference to the symmetry line SA1). This counter-torque can preferably be set so that on the basis of a leg width WS41 which is selected correspondingly large, the counter-torque attempts to turn the outer end of the leg SE11 of the chamber O1 laterally outward opposite the torque that attempts to diminish the size of the chamber O1 and thus attempts to spread the chamber O1 apart. As a result thereof, the leg SE11 advantageously remains essentially free of torque overall, for example the resultant overall torque is approximately zero. Analogous conditions derive for the leg SE21.

The legs SE11, SE21 thus advantageously remain essentially shape-stable or, respectively, dimensionally stable given a potential transfer stress, particularly a radial stress. A bending of the outer ends or, respectively, edges of the legs SE11, SE21, i.e. the plastic deformation inward toward the chamber O1 is thus largely avoided, so that the chamber O1 together with the ribbon stack BS1 placed therein also remain largely free of external forces. Since what are referred to as macro bending and/or microbendings of the light waveguides preferably combined in the form of a rectangular ribbon stack are thus largely avoided, an especially low-attenuation optical cable OC is obtained.

In FIG. 1, the wall thickness WS41 of the legs SE11, SE21 is dimensioned, for example, precisely so that the imaginary, straight line exertion VL1, i.e. the line of application for the radial force FR1 approximately forms a diagonal in the rectangular cross section of the leg. This representative force line thus preferably proceeds essentially straight-line through the cross section of the leg and essentially along the longitudinal extent thereof, particularly over the entire length thereof. At, for example, the leg SE11, this diagonal begins at the point of attack of the force FR1 at the outer leg edge facing away from the chamber O1 and ends roughly in the intersection of the inside wall or surface of the leg SE11 with the upper side of the chamber floor KB1, i.e. in the leg corner formed between the leg SE11 and the chamber floor KB1. The line of application VL1 thus proceeds through the wall or, respectively, edge of the leg SE11 lying at the inside and neighboring the chamber O1 to the set-up thereof at the chamber base KB1. This end point of the diagonal lies in the foot region, i.e, in an inside region of the leg SE11 neighboring the chamber floor KB1, and thus ends in the foot middle in the proximity of the imaginary pivot point thereof. With respect to this pivot point, the diagonal VL1 then roughly coincides with the course of the lever arm allocated to the leg SE11. Since the force FR1 is directed in a longitudinal direction in this lever arm, it can likewise not exert any bending moment on the leg SE11.

It can be especially reliable to prevent a bending of the outer leg ends into the originally rectangularly pre-shaped or, respectively, pre-defined chamber space O1 to potentially make the wall thickness WS41 of the legs of a size so that the line of application VL1 does not proceed diagonally but, rather, centrally within the cross section of the leg, i.e. the preferably straight line of application VL1, proceeding from the point of attack of the radial force FR1, does not mean at the inside corner on the floor of the chamber O1 adjoining the foot of the leg as its end point in the leg cross section, but aims more toward the middle of the leg in the base or, respectively, foot region of the leg SE11.

In order to reduce the effective surface for a resultant radial force such as, for example, FR1 at the outer end of the legs SE11, SE21, it can be expedient to respectively bevel the legs SE11, SE21 at their outer end on an inside thereof, i.e. their respective inside wall toward the chamber O1. The inside wall of the respective, outer leg end is thus shaped with an incline relative to its privileged direction that proceeds approximately vertically, i.e. perpendicularly relative to the chamber floor KB1. In FIG. 1, these beveled inside edges facing toward the chamber O1 are illustrated as dot-dashed lines AS11 and AS21 in the region of the outwardly projecting end faces of the legs SE11, SE21. What is preferably achieved with this measure is that externally applied, resultant radial forces can primarily attack essentially only in the region of the leg corner or, respectively, edge facing away from the chamber O1 at the outer end of the respective leg SE11 or SE21. A designational introduction of the force with low torque is thus advantageously created. Forces that attack in the region of the inside or, respectively, inside wall of the respective, outer leg end and that would then, if possible, proceed in their exertion outside the cross section of the leg are thus largely avoided.

Since the wall thickness WS11 of the chamber floor KB1 in FIG. 1 is preferably selected less than the wall thickness WS41 of the legs SE11, SE21, a rated bending area occurs for the chamber element KE1 that approximately coincides with the course of the symmetry axis SE1. In particular, the middle of the profile floor approximately forms a rated bend point or, respectively, a bend support point for the respective chamber element (such as, for example, CE1) given potential, external mechanical stresses such as, for example, when applying a retaining helix or an outside cladding. The overall chamber floor originally straight at the inside and outside, i.e. the bottom surface as well as the upper surface thereof, can thus advantageously adapt to the curved outside surface of the central element ZE for this reason. The thickness of the chamber floor between the two legs limiting the floor is preferably essentially constant, i.e. of the same size. In FIG. 1, for example, the chamber element CEn comprises a chamber floor KBn that is continuously arched in this way. As viewed in cross section, the receptive chamber element such as, for example, CEn thus expediently has at most 95°, particularly between 10° and 70° of the profile width of its chamber floor KBn lying against the circumferential surface of the central element ZE. As a result thereof, an especially reliable alignment of the chambers such as, for example, O1 radially outward can be achieved, for example given the assistance of a radially acting retaining helix force.

At the same time, two additional types of chamber element, KE2 and KE3, are additionally entered at the outside circumference of the central element ZE in the cross sectional view of FIG. 1, these differing from the chamber element CE1 on the basis of a modified cross sectional leg shape. In practice, only one respective type of chamber element is thereby preferably accommodated in the respective stranded ply of the cable core, i.e., for example, only chamber elements like KE2 or only like KE3. Just like the chamber element CE1, the chamber element KE2 or, respectively, KE3 comprises an approximately rectangular, radially outwardly open chamber O2 for the acceptance of individual light waveguides, light waveguide ribbons or of a rectangular light waveguide ribbon stack. For the sake of clarity, the latter have been omitted in the case of the chamber elements KE2 and KE3. The chamber O2 is thus limited radially inwardly by non-radially proceeding inside walls of two legs SE12, SE22 at the respective sides as well as by a planar chamber floor KB2, i.e. a chamber floor KB2 that is essentially straight-line in cross section at the inside as well as the outside. In particular, the chamber floor KB2 or, respectively, KB3 is fashioned like the chamber floor KB1 of the chamber element CE1 of FIG. 1. The inside wall of a leg is thereby respectively arranged at an angle of, for instance, 90°, i.e. perpendicularly, relative to the upper side or surface of the chamber floor KB2 that proceeds on a straight line. Proceeding from the chamber floor KB2, the wall thickness of the two legs SE12 and SE22 respectively continuously increases toward the outside up to their outer leg end, i.e. over their entire extent. In particular, the respective leg broadens continuously or, respectively, steadily from the chamber floor up to the outer end of the leg. The outside wall or surface of the respective leg, for example SE12, is consequently inclined by an angle greater than 90° relative to the chamber floor KB2. In particular, the outside wall of the respective leg, for example SE12, describes an angle between 92° and 100° with the originally planar, uncurved upper surface of the chamber floor KB2. Due to the increase in the wall thickness of the respective leg along the extent of the leg from inside toward outside, a broadening angle α that characterizes the respective leg widening occurs between the inside wall and the outside wall of the respective leg, for example SE22. The wall thickness of the respective leg such as, for example, SE22 preferably increases steadily toward the outside above the set-up point of the respective leg foot at the chamber floor according to the relationship $$\tan\alpha = \frac{(WS42 - WS32)}{h},$$

whereby α denotes the broadening or, respectively, aperture angle between the outside and the inside of the respective leg SE12 or SE22; WS42 denotes the wall thickness of the respective leg SE12 or SE22 at its outer leg end; WS32 denotes the wall thickness of the leg SE12 or SE22 at its set-up point immediately at the chamber floor KB2; and h denotes the inside height of the chamber O2.

According to this dimensioning rule, the respective leg, for example SE12 or SE22, thus preferably comprises an approximate trapezoidal shape in cross section. Expediently, the broadening angle e for the web or leg widening is selected in a range of between 0.5° and 7°, and preferably between 2° and 5°. The width or wall thickness of the legs SE12 and SE22 preferably increases in a range of 0.1 mm through 0.62 mm over a length h of a range between 3 and 5 mm.

When, for example, a resultant radial force FR2 attacks at the outer end of the leg SE12 in the region of the outside edge thereof, i.e. at the leg corner facing away from the chamber O2, then the force FR2 imaginary, preferably straight extension VL2 toward the cable axis M advantageously again proceeds within the cross section of the leg. Since the application of force in a radial direction occurs essentially completely within the leg SE12 according to the same principle as given the chamber element CE1, the radial force FR2 is transmitted approximately completely to the central element ZE, which is resistant to crushing strain, without essentially modifying the original course or, respectively, shape of the leg SE12. Just as in the case of the chamber element CE1, a total torque of approximately zero occurs for the leg SE12. Due to the preferably steadily pre-shaped leg expanding toward the outside, the respective leg such as, for example, SE12 advantageously remains largely dimensionally stable in view of potential radial stresses, i.e. remains insensitive to plastic deformations. The outwardly spreading leg shape lends the leg a greater stiffness and strength, when compared to the chamber element type CE1 of FIG. 1 and when potentially resultant, transverse compressive stresses acting radially are applied to the leg, so that a bending of the outer ends of the legs inward toward the chamber O2 is especially reliably avoided. Therefore, a chamber element that is advantageously especially resistant to transverse compressive stresses and that has only a slight or absolutely no tendency in practice to "constrict", i.e. to diminish the size of the originally pre-defined chamber space O2 during stranding is obtained.

An especially hard, thermoplastic plastic material such as, for example, polycarbonate is expediently selected for the chamber element KE2. Alternatively thereto, plastic materials such as, for example, HDPE (high density polyethylene), PP (polypropylene), etc., or multi-layer profiles can also be employed. A material strength in the transverse direction that roughly corresponds to the material strength in the longitudinal direction can be achieved, particularly by oriented extrusion. The ratio of the material strength in the transverse direction relative to the longitudinal direction of the chamber element material is advantageously selected between 0.9–0.95/1.

In order, in particular, to minimize the application surface of the legs for potential radial forces in the region of their outer ends and in order to assure a defined introduction of forces, the inside walls of the legs SE12, SE22 can be beveled thereat, similar to the case of the chamber element CE1. In the chamber element KE2, this endface, inside-wall beveling of the legs SE12, SE22 is schematically indicated with dot-dashed lines AS12, AS22.

In order to make it possible that the underside or bottom of the chamber floor KB2 that is preferably of approximately the same thickness can be applied optimally surface-wide against the curved outside surface of the circular-cylindrical central element ZE by plastic or elastic bending, for example given the assistance of an outwardly applied retaining helix, the floor wall thickness WS12 thereof is preferably selected equal to or less than the leg wall thickness WS32 in the foot region, for example in the region of its leg set-up at the chamber floor. Expediently, the wall thickness WS12 of the chamber floor KB2 is dimensioned in a range of 1.05 through 2 times, and preferably 1.1 through 1.3 times smaller than the minimum leg wall thickness WS32 at the leg base. An especially reliable transmission of forces via the legs SE12, SE22 to the central element ZE can thus be assured.

Before the stranding process onto the central element ZE, the chamber floor KB2 can preferably be pre-arched at its bottom corresponding to the radius of the outside contour or surface of the central element ZE, so that the bottom KB2 can be applied against the curved outside contour of the central element ZE in a large area and in an especially simple way. Due to this pre-matching or, respectively, pre-shaping of the bottom surface of the chamber floor KB2, the centering of such a chamber element of the invention before the stranding process is also essentially simplified at the same time. The chamber elements are thereby secured in position in their respectively allocated stranding position at the central element ZE, preferably with the assistance of a retaining helix. Opposite their potential, inherent twist or torsion, they are thereby automatically aligned so that their chamber middle (see SA1, SA3) is directed radially outward. A turning or tilting of the chamber elements toward the side, i.e. in a circumferential direction, is thus advantageously largely avoided.

In FIG. 1, for example, the chamber element KE3 is stabilized in a central structural position with a retaining helix HW. This retaining helix HW is only partially shown in FIG. 1 and has been omitted from the remaining part of the FIG. for the sake of clarity. The retaining helix HW is preferably helically wound onto the chamber elements stranded with one another to form an elongated transmission element, and the winding occurs immediately after the stranding process. The chamber element KE3 thereby largely corresponds to the chamber element KE2, whereby identical elements are provided with the same reference characters. The retaining helix HW exerts a radial force onto the chamber element KE3 so that the chamber floor KB3 thereof presses optimally flush against the outside circumference of the central element ZE. The chamber floor KB3, which was originally straight at the inside and outside surface and which has an approximately constant wall thickness, arcs under the transverse compressive stress applied by the retaining helix and adapts to the curved outside contour of the central element ZE. The chamber floor KB2 thus turns convexly up as a whole and thereby spreads the outer leg ends somewhat apart, so that an additional widening of the chamber space occurs. As a consequence, the chamber element is automatically aligned so that its symmetry axis SA3 indicated with a dot-dashed line proceeds through the chamber middle in a radial direction, i.e. the chamber opening points radially outward with respect to the middle line of the chamber. This centered stranding position for the chamber element KE3 is also characterized in that the outer corners of the legs SE12, SE22 at the outer circumference of the central element ZE comprise approximately the same radial spacing r2 or, respectively, r1 with r2≈r1 relative to the cable longitudinal axis M. The retaining helix HW thereby supports the respective leg end, for example, at SE12 at both sides at the outside and inside edge thereof.

This fixing of the profiled webs is additionally promoted by an externally applied outside cladding AM of the optical cable OC. For the sake of clarity, the outside cladding AM is only partially shown in FIG. 1 and has been omitted in the remaining part of the FIG. This plastic outside cladding AM, which is preferably extruded on and is applied in a single-layer or multi-layer, potentially stresses the legs, for example, SE12 with an additional radial force component. As warranted, the outside cladding AM can thereby also comprise additional armoring elements or reinforcements. The cladding AM thereby presses ("dents") the retaining helix HW helically applied on such a fabricated transmission element somewhat inward in the region of the opening O2 and thereby tenses the helix over the webs. These legs SE12, SE22 of the chamber element KE3 then exercise a type of supporting pillar function within the cable structure or cable core in this defined, aligned condition. Together with the retaining helix HW, the legs SE12, SE22 advantageously provide a vaulted design that keeps the chamber O2 optimally free of influences of external forces. The broadening of the cross sectional area of the legs toward the respective leg end also prevents an inadmissibly great penetration of the legs into the structure of the outside cladding AM that has been extended on during the cable manufacture and thus the legs reliably oppose a reduction in the size of the interior of the chambers.

When, for example, an additional transverse compressive stress also attacks in the region of the chamber element KE3, for example during cable laying, then the sum of this total of three radially acting sub-forces is conducted toward the inside to the cable axis M directly via the legs SE12 and SE22 without modifying the receptively pre-defined leg course or shape, i.e. the originally given cross sectional leg shape to an inadmissibly great extent in practice. The radial force attacking overall with the resultant radial force at the outside edge of the leg SE12 and is symbolized in FIG. 1 by an arrow having reference character FR3. This resultant radial force FR3 proceeds essentially inside or within the profiled cross section of the leg SE12 in its imaginary, radial extension VL3 toward the cable axis M, preferably on a straight line over the entire leg length. An angle Z is thereby described between the imagery extension VL3 and the symmetry axis SA3.

The angle Z can preferably be consulted for dimensioning the respective leg course, i.e. for the shaping of the respective leg cross section. This is set forth in greater detail with reference to FIG. 2 that shows the chamber element KE3 of FIG. 1 in detail in the original, unstressed condition before being stranded onto the central element ZE. Elements transferred unmodified from FIG. 1 are thereby respectively provided with the same reference characters. The legs SE12, SE22 are arranged to reside at a respective angle $\beta 1$ relative to their chamber floor KB3 that proceeds on a straight line in cross section. For accepting rectangular light waveguide ribbon stacks, for example, BS1 of FIG. 1, the angle $\beta 1$ is preferably selected to be approximately equal to 90°, so that the legs SE12, SE22 respectively extend perpendicularly to the chamber floor KB3 and an essentially rectangular, outwardly open chamber space O2 occurs. In order to especially reliably oppose a bending of the critical, outer ends of the legs SE12, SE22 into the chamber space O2 due to deformation and, thus, the diminution or contradiction of the space O2 in the admission region, it can be expedient to additionally incline the legs SE12, SE22 outward away from the chamber space O2 by an angle $\beta 2$ compared to their rectangular arrangement. The legs SE12, SE22 are thus inclined overall on an angle $\beta 1 + \beta 2 > 90°$ relative to their chamber floor KB3. The inclination angle $\beta 2$ with which the inside wall of the respective leg, for example, SE12 is additionally inclined compared to the perpendicular alignment is expediently selected in a range between 0° and 8°, and preferably in a range between 0.5° and 5°, i.e. the angular sum $\beta 1 + \beta 2$ lies in a range between 90° and 98°, and preferably in a range between 90.5° and 95°.

Figure 2:
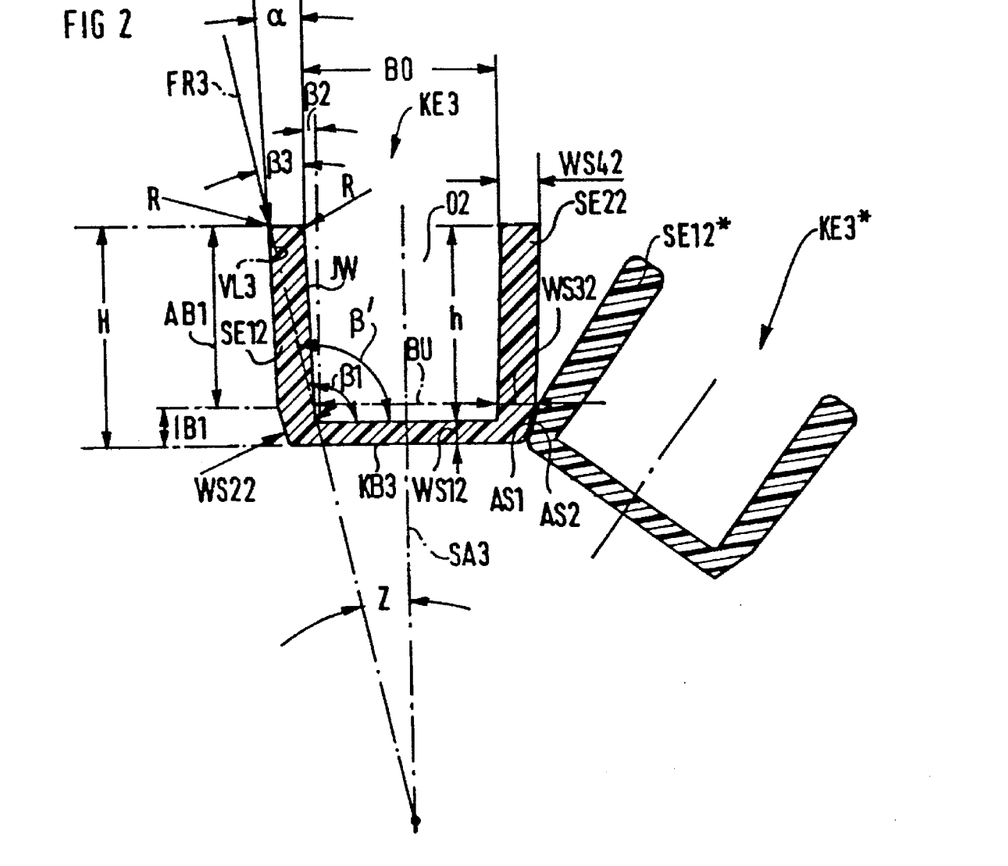
FIG. 2 is a schematic cross section through two chamber elements from FIG. 1 shown in detail.

In view of the bending moment potentially exerted onto the respective leg, for example, SE12, it is the edge (outside edge) facing away from the chamber O2 at the outer end of the leg SE12 that is especially critical as the attack point for a radial force. Of all possible radial forces attacking or acting at the face end of the leg, namely, a resultant radial force such as, for example, FR3 potentially attacking thereat particularly exerts a maximum torque on the leg SE12 that attempts to bend the outer leg end into the admission opening of the chamber. For the sake of simplicity, an appertaining, imaginary pivot point at the inwardly disposed leg corner of the leg foot (in the region of the chamber floor KB3) shall be assumed in this approximate observation for the leg SE12. In order to be able to assure a torque-free introduction of force into the leg SE12 at least for this especially critical, defined point of attack, the dimensioning of the leg cross section or geometry is undertaken so that the line of application or imaginary extension VL3 of the radial force FR3 forms a cross sectional diagonal in the leg SE12, i.e. a straight line, expressed in general terms, that passes through the leg cross section over its entire length and thereby also optimally remains therein. Proceeding from the point of attack of the radial force FR3 at the outside edge of the leg SE12, thus, the line of application VL3 proceeds up to the inside edge thereof at the chamber floor KB3. The line of application VL3 thereby describes an angle $\beta 3$ with the inside wall of the leg SE12 that characterizes the increase in wall thickness of the leg SE12 from the chamber floor up to the outer end of the leg. The leg SE12 is thus broadened or widened toward the outside by the angle $\beta 3$ between its inside limiting the chamber O2 and its cross sectional diagonal. Expediently, the angle β3 is selected in a range between 0.5° and 25°, and preferably in a range between 2° and 12°. An inclination angle β'=β1+β2+β3 thus occurs overall between the line of application VL3 and the chamber floor KB3.

The relationship $$(\beta' - 90°) \leq \frac{360°}{2n}$$

preferably occurs as an upper limit for this selectable overall inclination angle β', i.e. an overall inclination angle β' that can be prescribed in defined fashion and by which the outside edge of the outer leg end is inclines relative to the chamber floor KB3, wherein n denotes the plurality of chamber elements at the outside circumference of the central element ZE in the annular stranded ply.

Given, for example, the trapezoidal cross sectional shape of the leg SE12 (trapezoidal leg geometry), the relationship $$\tan \beta 3 = \frac{WS42}{h}$$

approximately derives for the angle β3 that characterizes the leg broadening.

In order to assure that the leg SE12 remains low-torque overall, the overall inclination angle β'−90° is preferably selected approximately equal to the angle Z in a first approximation. This situation is shown in FIG. 2. The angle Z thereby preferably occurs from the relationship $$Z = \arctan \left[ \frac{1/2 \cdot BO^*}{r_{ZE} + H} \right],$$

wherein BO* denotes the spacing between the two outside walls or surfaces of the legs SE12 and SE 22 in the region of their outer ends. The relationship BO*≈BO+2 WS42 thereby advantageously approximately applies, wherein BO indicates the inner clearance between the inside walls or surfaces of the outer leg ends. The designation $r_{ZE}$ stands for the radius of the central element ZE given a single-ply cable structure and H stands for the overall height of the chamber element KE3 calculated from the underside or bottom surface of the chamber floor KB3 up to the end face of the leg ends. The clearance BO, the overall height H as well as the radius $r_{ZE}$ are thereby each quantities that can be respectively advantageously prescribed. In particular, the following relationship also approximately occurs for the radius $r_{ZE}$:

$$r_{ZE} = \frac{BU^*}{2} \sqrt{\frac{1}{\left[ \sin\left(\frac{180°}{n}\right) \right]^2} - 1}$$

whereby BU*≈(BU+2 WS32). BU thereby references the clearance between the inside walls of the legs SE12, SE22 and the chamber floor KB3. WS32 stands for the smallest wall thickness of the respective leg extent at the set-up point of the leg such as, for example, SE22 in the region of the chamber floor KB3. BU* thus represents the spacing between the two outside walls or surfaces of the legs SE12 and SE22 at their base viewed in a circumferential direction.

A profiled cross sectional shape that is especially resistant to deformation can be particularly achieved in that the chamber element KE3 is pre-shaped, particularly extruded with a greater clearance BO between its two legs SE12, SE22 in an outer region AB1 facing away from the chamber floor KB3 than in an inner region IB1 neighboring or adjacent the chamber floor KB3. The inner region IB1 is thereby defined between the setup point of the leg SE12 and the chamber floor KB3 and the underside or bottom surface of the chamber floor KB3. The outer region AB1 adjoins this inner region IB1 above the chamber floor KB3 up to the outer end of the leg SE12. Expediently, the outer region AB1 of the legs is respectively selected in a range of 2 12 times, and preferably in a range of 5–10 times greater than the inner region IB1 thereof. The outer region AB1 preferably extends over a length of a range between 2.8 and 5 mm and the inner reign IB1 preferably extends over a length of a range between 0.4 and 1 mm. The clearance BO in the inner region IB1 of the chamber O2 in FIG. 2 is initially preferably selected smaller than the clearance BO in the outer region AB1, so that an outwardly expanding chamber space occurs in the original, unstressed condition. The clearance BO in the outer region AB1 advantageously steadily increases from inside to outside. In particular, the chamber space is approximately trapezoidally spread open (see FIG. 2). Expediently, the clearance BO between the two inside walls or surfaces of the outer leg ends in the outer region AB1 is selected in a range of 1.02 through 1.2 times, and preferably in a range of 1.02 through 1.08 times greater that the clearance BU at the chamber floor KB3. In this way, the legs SE12, SE22 can be pressed or, respectively, bent inwardly into the original chamber space by the additionally existing safety margin angle β2 later, for example during cable manufacture (stranding the chamber elements) without the rectangular ribbon stack, for example, BS1 in FIG. 1, which is respectively introduced into the chamber, being touched or even mechanically stressed in an inadmissible way. (For the sake of clarity, such an introduced ribbon stack has been omitted in FIG. 2.) For this reason, the inside clearance BU is expediently selected at least equal to the actual ribbon width; in particular, BU≧(0.4 mm+ribbon width) applies.

As a result of this additional, previously introduced widening or, respectively, spreading of the chamber O2 laterally outward, i.e. laterally outward in the circumferential direction, the outer, originally provided clearance BO of the chamber element KE3 can be diminished relative to the inner clearance BU in a defined way by subsequently introduced deformations, for example, due to the stranding forces, due to the retaining force of a retaining helix or due to other transverse compressive stresses. The desired, rectangular chamber space O2 thus occurs in the finished cable under operating conditions. An additional safety zone is thus offered by which the legs SE12, SE22 can be deformed toward the symmetry line SA3, i.e. can be bent inward, without thereby tilting or, respectively, canting the ribbon stack introduced in practice out of its force-free structural position between the legs SE12, SE22 in an inadmissible way or of even pinching or, respectively, clamping the stack. The outer clearance BO can thus be subsequently reduced in size, for example during the actual cable fabrication, but only to such an extent insofar as possible so that the required, inner clearance BU is not downwardly transgressed. The chamber space O2 thus assumes the desired cross sectional shape. In particular, the chamber space is rectangular. Far fewer external forces can thus take effect on the introduced, rectangular ribbon stack given transverse compressive stresses.

In order to be able to achieve a support of the chamber elements that are preferably annularly arranged in a stranded ply, it can be expedient to respectively bevel the outside of the legs in the inner region IB1, i.e. at the leg base, so that the respective outside wall proceeds more or less radially only thereat. The wall thickness WS22 of, for example, the leg SE12 thereat is less than its wall thickness WS32 at the transition, i.e. in the boundary region from the inside region IB1 to the outside region AB1. In FIG. 2, for example, the two chamber elements KE3 and KE3* are supported in the inside region IB1 of their neighboring legs SE22, SE12* at their appertaining, beveled outside walls AS1 and AS2 and thus advantageously form a compact, space-saving arrangement. The chamber element KE3* is thereby constructed analogous to the chamber element KE3. The following dimensioning for the chamber element KE3 are advantageously expedient in practice and were tested with particular success:

WS42≧WS32 and/or

WS32≧WS22 and/or

WS22≧WS12, whereby

WS42 is the wall thickness of the legs SE12, SE22 at their respective outer end in an outer region AB1 facing away from their chamber floor KB3;

WS32 is the wall thickness of the legs, for example SE12, SE22, upon transmission between an outer region AB1 facing away from the chamber floor KB3 and an inner region IB1 neighboring the chamber floor KB3;

WS22 is the wall thickness of the legs, for example SE12, SE22, in an inner region IB1 neighboring their chamber floor KB3; and WS12 is the wall thickness of the chamber floor KB3 that, in particular, is of approximately identical thickness between the two legs that laterally limit the floor KB3.

The legs, for example SE12, SE22, are preferably respectively dimensioned so that the following is valid for the wall thicknesses WS12 through WS42:

WS42=1.0 through 2.5 WS32, preferably WS42=1.2 through 2.0 WS32, and/or

WS32=1.0 through 1.2 WS22, preferably WS32=1.0 through 1.1 WS22, and/or

WS22=1.0 through 1.5 WS12, preferably WS22=1.0 through 1.2 WS12.

The following, absolute wall thicknesses of the chamber elements such as, for example, KE2, KE3 are particularly expedient, preferably given h≦5 mm and U-profiles of PC:

WS42 between 0.6 and 1.5 mm, preferably between 0.7 and 1.0 mm, and/or

WS32 between 0.4 and 0.75 mm, preferably between 0.5 and 0.7 mm, and/or

WS22 between 0.35 and 0.6 mm, preferably between 0.4 and 0.6 mm, and/or

WS12 between 0.25 and 0.5 mm.

The above dimensioning particulars are also preferably expedient for the other types of inventive chamber elements according to FIGS. 1–9.

A resultant radial force (for example, the radially inwardly acting retaining force of the retaining helix, the transverse compressive force of the outside cladding or other radial forces attacking or acting at the outside cladding of the finished cable) can be opposed with an enlarged effective surface preferably by an increase in the leg wall thickness toward the outside as in the case of the chamber elements KE2, KE3 (see FIGS. 1, 2), particularly on the basis of a thickening WS42 thereof at the respective, outer leg end. The outer leg end that is particularly critical to deformations or bending can be particularly respectively made insensitive with this thickening of the material. In order to oppose mechanical damage to the respective ribbon stack during the insertion event of the stack into the respectively allocated chamber element during cable manufacture, it may also be potentially expedient to additionally round off the outer end of the respective leg, for example, SE12 with a radius R at the outside edge and/or inside edge thereof.

The chamber element KE3 of the invention is also particularly distinguished by a low torsional stiffness, so that the element can be brought especially easily into its respectively clearly allocated stranding position on the central element ZE. Despite a privileged twist direction of the chamber element to be stranded that may potentially be introduced during the stranding thereof, the element therefore hardly opposes any resistance to its alignment (with the retaining helix HW of FIG. 1) into its allocated, symmetrical stranding position [or: ply ?]. The following is approximately valid for the element's torsional stiffness k:

$$k = Mt/\phi = \frac{G(BO \cdot WS12^3 + 2H \cdot WS31^3)}{3},$$

wherein $\emptyset$ denotes the stranding angle; Mt denotes the permissible bending moment and G references the shear modulus of the leg material. In particular, WS32 here indicates approximately the average leg wall thickness. By comparison to traditionally designed chamber elements having floor and leg wall thicknesses that are approximately of the same size, a ratio of torsional stiffness of 1:1.51 derives, for example, for the chamber element type KE3 of FIG. 2, whereby the following dimensions are valid by way of example:

EXAMPLE 1

|    | BO   | WS12 | H    | WS32  |
|----|------|------|------|-------|
| U1 | 3.68 | 0.63 | 4.56 | 0.685 |
| U2 | 3.46 | 0.43 | 4.23 | 0.645 |

EXAMPLE 2

(Ratio of the torsional stiffness compared to a traditional chamber element type 1:1.3)

In particular, chamber elements corresponding to the dimensioning particulars of Example 2 were thereby especially successfully tested.

|    |     |      |     |      |
|----|-----|------|-----|------|
| U1 | 3.5 | 0.65 | 4.5 | 0.65 |
| U2 | 3.5 | 0.4  | 4.5 | 0.65 |

U1 indicates the traditional, previous chamber element type having approximately the same, relatively slight wall thickness of the chamber floor and of the legs, i.e. WS12≈WS32 is valid therein. U2, by contrast, represents the chamber element type of the invention as reflected by the chamber elements KE2, KE3 in FIGS. 1 and 2.

Figure 3:
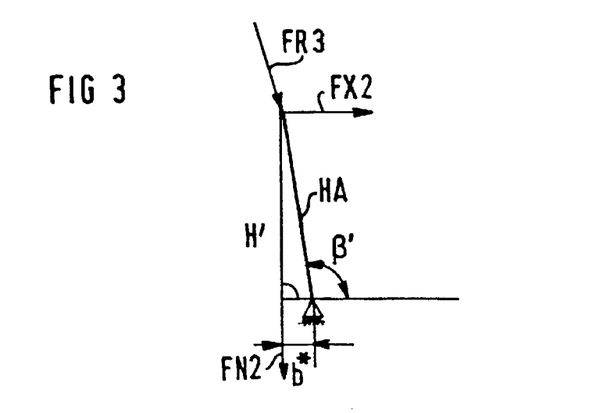
FIG. 3 is a schematic illustration of a lever arm diagram for one of the legs of the chamber elements of FIG. 2.

FIG. 3 illustrates the torques taking effect at the respective leg, for example, SE12 of FIG. 2. Elements transferred unmodified from FIG. 2 are respectively provided with the same reference characters. For example, the resultant radial force FR3 can be resolved into a force component FX2 directed in the circumferential direction as well as into a force component FN2 directed perpendicularly to the circumferential direction, vertically relative to the chamber floor KB3. When the pivot point for the leg is assumed, for example, approximately at that location at which the inside wall of the leg SE12 collides or meets with the chamber floor KB3 (left, lower corner point of the chamber O2), then a lever arm HA approximately occurs for the leg SE12 that, proceeding from the outside edge of the leg SE12 at the outer end, proceeds toward the inside edge of the leg SE12 at the chamber floor. In a simple approximation the force FX2 thus causes a moment Mzu=FX2·H' that constricts the chamber O2, whereby H'≈h+WS12/2 applies. h denotes the inside height of the chamber O2. This moment Mzu is opposed by a counter-torque Mauf=b*(FN2) that spreads the chamber O2 open, whereby b*≈H' tan (β'90) is selected.

The equation:

$$M\text{resultant} = Mzu - Mauf = FR3 \left( h + \frac{WS12}{2} \right) [\sin Z - \cos Z \tan(\beta' - 90°)]$$

approximately provides the resultant moment, i.e as bending moment taking effect overall at the leg SE12. This resultant moment at the leg SE12 preferably becomes zero for $Z = \beta'-90 \approx \beta 2+\beta 3$. Due to the dimensioning of the angle β', the moment Mzu is preferably reduced at least to half in terms of amount due to the counter-moment Mauf that is generated. The counter-torque Mauf at the leg SE12 effected by the force component FN2 becomes all the greater, i.e. torque Mzu can be compensated all the better the farther the cross sectional diagonal (see VL3 in FIG. 2) is inclined toward the outside, i.e. the greater β3 is.

Since it is a matter of plastic profiles, plastic buckling shall be expediently counted on below. The leg broadening or widening is therefore expediently undertaken in that the respective leg withstands, for instance, an allowable buckling force:

$$F_{k_{zu1}} = \frac{\pi^2 \cdot E \cdot J_{min}}{h \cdot \gamma},$$

whereby $$J_{min} \approx \frac{h \left( \frac{WS42 + WS32}{2} \right)^3}{12}$$

is the geometrical moment of inertia of the respective leg in a first approximation, E is the modulus of elasticity and γ is safety factor. The legs SE12, SE22 are preferably designed for a maximally allowable bucking force, with γ=4 as well as with reference to a U-profile length section of 1 mm, of a range between 10 and 200 N, particularly between 50 N and 100 N preferably on average around 40 through 90 N, given a transverse compressive force onto the cable of approximately 4000N/10 cm in the brief-duration load range (loading in the range of minutes). In particular, the cable experiences an attenuation increase of at most 0.1 dB on this length section of 10 cm. To prevent bending in a circumferential direction, the leg cross sections are designed so that they withstand a maximally allowable bending force FX2 (see FIG. 3) between 0.5 and 10 N, particularly between 2 and 5 n in the circumferential direction, so that BU≦BO is always valid.

The slenderness ratio for the respective leg is preferably selected λ≦20 in order to avoid a leg buckling. The relationship $$(WS42 + WS32)/2 = \sqrt{12} /\lambda \cdot h \approx 0.18 h$$

(for λ=20) is preferably valid with $$\lambda = \frac{h}{\sqrt{J_{min}/A}},$$

whereby A is the respective cross sectional area of the U-profile web.

Overall, a leg cross sectional area that expands outwardly from the inside toward the outside (viewed over the full leg length) derives particularly due to the increase in the wall thickness of the legs (leg broadening) at the chamber elements such as, for example, KE2, KE3 in FIGS. 1 and 2. As a result of the effective surface of the profiled legs respectively enlarging toward the outer leg end, these respectively exhibit high strength to bending as well as buckling both individually and in union, i.e. they are especially dimensionally stable due to their preferably trapezoidally widened leg geometry and are thus far less sensitive to transverse compressive stresses. A predetermined, constant cable diameter can be observed in this way. A reduction of the chamber space, so that the minimum width prescribed by the width of the ribbon stack, i.e. the desired minimum width of the chamber is downwardly transgressed, is thus largely avoided.

Figure 4:
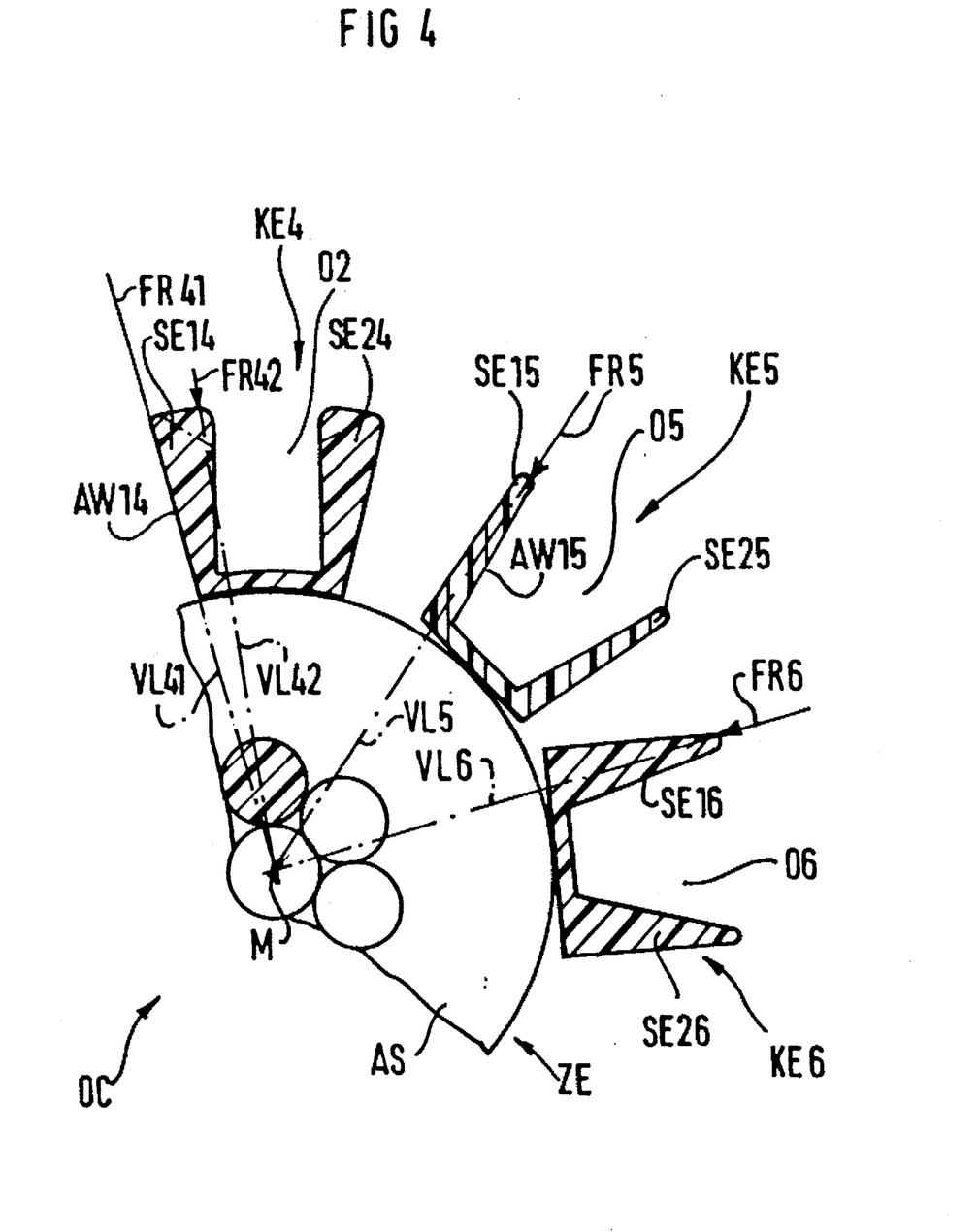
FIG. 4 is a partial schematic cross sectional view through additional exemplary embodiments of chamber elements of the present invention for an optical cable of FIG. 1.

FIG. 4 simultaneously shows three additional embodiments KE4 through KE6 of chamber elements of the invention. Elements transferred unmodified from FIGS. 1–3 are thereby provided with the same reference characters. In practice, only one model or, respectively, one type of chamber element is applied on the central element ZE, i.e. only, for example, chamber elements corresponding to KE4. In particular, the respective chamber floor of the chamber elements KE4 through KE6 is fashioned like the chamber floor of the elements CE1, KE2 and KE3 of FIGS. 1 and 2. For the sake of clarity, the ribbon stack (see, for example, BS1 in the case of the chamber element CE1 ) allocated to the respective chamber element has been omitted. The chamber element KE4 differs from the chamber element KE2 of FIG. 1 only in that the outside walls or surfaces AW14 of the legs SE14, SE24 proceed radially over the entire length. The inside leg walls or surfaces, by contrast, do not extend radially but each reside approximately perpendicularly to the chamber floor, so that they laterally limit an approximately rectangular chamber corresponding to O2 in the case of the chamber element KE2. The dimensioning particulars made with respect to FIGS. 1–3, statements and relationships of leg geometry disclosed there, particularly for the course of the inside leg walls are otherwise preferably valid except for the course of the outside leg walls. Compared to the chamber element KE3, the legs SE14, SE24 of the chamber element KE4 respectively comprise a wall thickness that increases more greatly from inside toward outside as a result of their radially proceeding outside walls, i.e. the chamber element KE4 in FIG. 4 exhibits a leg geometry that is strengthened further by comparison to the chamber element KE3. What such a leg shape effects is that, for example, a radial force FR41 that attacks or acts at the outside edge of the leg SE14 is diverted to the central element ZE directly at the outside or, respectively, outside wall AW14 of the leg SE14 and, thus, remote from the chamber. This defined force guidance in a radial direction along the outside of the leg SE14 is indicated in FIG. 4 with the assistance of a straight extension line VL41 of the radial force FR41 shown dot-dashed to the cable axis M. Since the elimination of the force remains respectively remote from the inside leg wall, a bending of the free leg ends in a circumferential direction into the symmetry axis of the chamber KE4 is especially reliably suppressed, as is, thus, an inadmissible diminution of the chamber space O2 to the effect that the minimum chamber width is downwardly transgressed. The minimum chamber width at the chamber floor is preferably selected equal to or greater than the ribbon stack width. The rectangular chamber O2 of the chamber element KE4 thus remains low for external forces in an especially reliable way. Even though the inside wall of the legs SE14, SE24 does not proceed radially, but resides perpendicularly relative to the chamber floor KB, a radial force FR42 attacking or acting, for example, at the inside edge at the outer end of the leg SE14 is also guided essentially within the leg cross section. This is indicated by a dot-dashed extension line VL42. A deformation of the legs SE14, SE24 at their respective outer end into the defined, rectangular chamber space is thereby practically avoided. Under certain circumstances, moreover, it can already be adequate for the respective outside leg wall to proceed radially over the majority part of its overall length.

The chamber element KE5 proceeds from the chamber element KE3 of FIG. 2 in that the inside walls or surfaces AW15 of the legs SE15, SE25 now proceed radially over their entire length insofar as possible. The outside leg walls or surface, by contrast, proceed in exactly the same way as in the case of the chamber element KE3. In particular, they reside approximately perpendicularly on the chamber floor. Other leg geometry relationships, statements and dimensionings recited with respect to the exemplary embodiments of FIGS. 1–3 preferably correspond except for particulars regarding the course or structure of the inside leg walls. In this way, the two legs SE15 and SE25 limit a trapezoidally widened chamber space O5, i.e. the width thereof increases from inside toward outside as viewed in circumferential direction. As a result thereof and differing from the chamber element KE3 of FIG. 2, a leg cross sectional shape tapering from inside to outside occurs, i.e. the wall thickness of the legs decreases from inside to outside, preferably steadily. A turning of the legs SE15, SE25 around their respective foot point at the chamber floor toward the inside in the direction of the chamber O5 and, thus, a contraction of the chamber O5 is likewise reliably opposed in this way. A resultant radial force potentially attacking at the outer leg end such as, for example, FR5 at the leg SE15, namely, proceeds approximately centrally in terms of its imaginary, straight extension VL5 indicated dot-dashed and thus likewise proceeds within the cross sectional area of the legs. The radial force FR5 is thereby aligned roughly parallel to the inside wall or surface AW15 of the leg SE51 and can thus not charge the leg SE15 with an inadmissibly high, resultant overall torque in the circumferential direction. On the contrary, the radial force FR5 is directly diverted to the central element ZE without begin able to take effect at the leg SE15. The spacing of the inside walls of the legs SE15, SE25 from one another in the region of the chamber floor is expediently selected corresponding to the width of the light waveguide ribbon stack to be introduced. The ribbon stack is positionally secured in the circumferential direction in advance in this way, at least at the chamber floor. On the basis of subsequent bending or, respectively, deformation of the leg ends such as, for example, during cable manufacture with the assistance of a retaining helix (see HW in FIG. 1), the leg ends are then bent together toward the chamber O5 so that the desired rectangular chamber space is established but also so that the required minimum width at the chamber bottom is not downwardly transgressed insofar as possible. As a result of this pre-widening of the chamber from the inside toward the outside, an inadmissible pressing or pinching of the inserted ribbon stack can be reliably avoided even when the outer leg ends are bent inward toward the chamber O5. An additional, allowable latitude by which the legs can be inwardly bent until an approximately rectangular chamber is ultimately formed thus occurs. That angle by which, for example, the leg SE15 can be inwardly inclined preferably derives from the intermediate angle (see β2 of FIG. 2) between the course of the inside of the leg SE15 and an imaginary perpendicular on the straight chamber floor.

The chamber element KE6 proceeds from the chamber element KE5 particularly in that the inside walls or surfaces of the legs are inclined relative to the chamber floor by a larger angle than in the case of the chamber element KE5. Consequently, its legs SE16 and SE26 outwardly tapered to a greater extent. In the foot region, the legs SE16, SE26, by contrast, comprise a greater wall thickness given the same chamber element height and are therefore especially secure against a turning or bending. When, for example, a resultant radial force FR6 attacks at the outer end of the leg SE16, the introduction of the force again ensues along a line of application VL6 within the cross section of the leg. The line of application VL6 is likewise entered dot-dashed in FIG. 4 and approximately coincides with the symmetry axis of the leg SE16. Since the wall thickness of the legs SE16, SE26 decreases from the inside to the outside, particularly steadily diminishing, the effective surface for potentially attacking radial forces is also reduced. As a result of the spreading of the legs laterally toward the outside, they are especially resistant and dimensionally stable given possibly occurring, radial stresses. At the same time, the chamber O6 of the chamber element KE6 is trapezoidally broadened in advance toward the outside, so that an additional safety zone by which the legs can be bent together, for example during the actual cable manufacture, toward an essentially rectangular receptacle chamber then occurs and is available at the outside at the leg ends that are critical with respect to being bent inward. An envelope resistance to transverse compression can likewise be additionally provided as warranted in the case of the chamber elements KE5, KE6, for example, an aluminum cladding, in order to additionally help suppress an inadmissibly deep penetration of the respective leg ends into the outside cladding applied on the outside.

What are to be predominantly understood within the framework of the invention by chamber elements that are not sector shaped, as shown in FIGS. 1–9, are those that are fashioned approximately U-profiled in cross section and that do not comprise a cross sectional contour that is essentially shaped like a circular sector element. In particular, their chamber floor is not fashioned only in the shape of a circular sector, so that they cannot be combined to form a full circle like circular sector elements. Such chamber elements that are not sector shape are particularly distinguished in their ultimate condition (preferably after being stranded) by approximately rectangularly fashioned chambers or, respectively, receptacle spaces. In addition, the concept of "not sector shaped" here also covers chamber elements whose inside leg walls proceed approximately perpendicularly relative to the chamber floor and shows outside leg walls that do not extend perpendicularly relative to the chamber floor but, for example, in a radial direction or in other directions. Chamber elements are also preferably covered wherein only the outside leg walls reside approximately perpendicularly on the chamber floor, the inside leg walls thereof, by contrast, proceeding essentially non-perpendicularly, thus, for example, in a radial direction.

Figure 5:
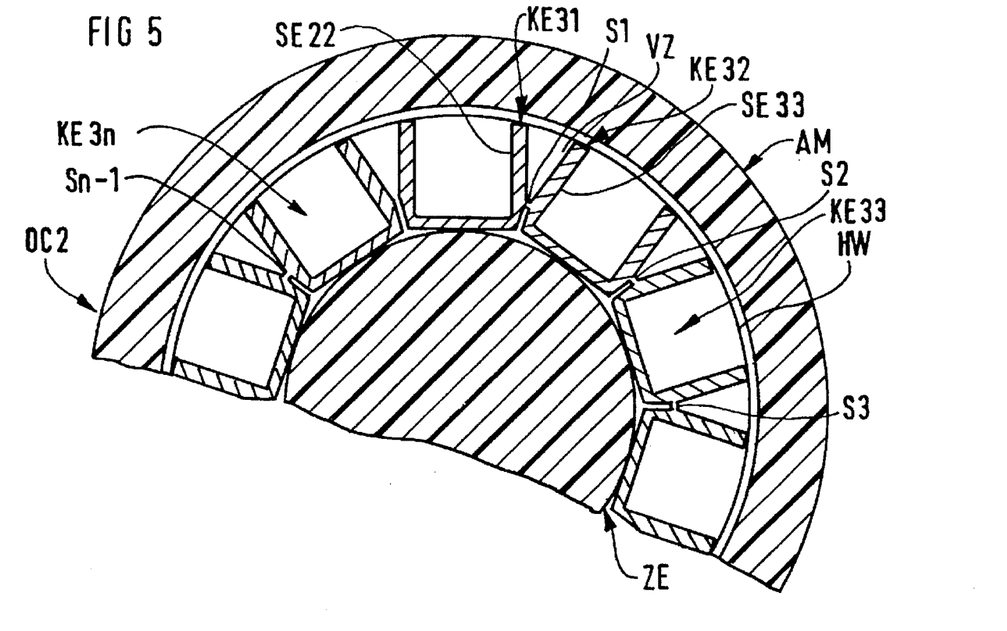
FIG. 5 is a partial schematic cross sectional view through an additional exemplary embodiment of an optical cable of the present invention having chamber elements of FIG. 2 which are mechanically connected to one another.
Figure 6:
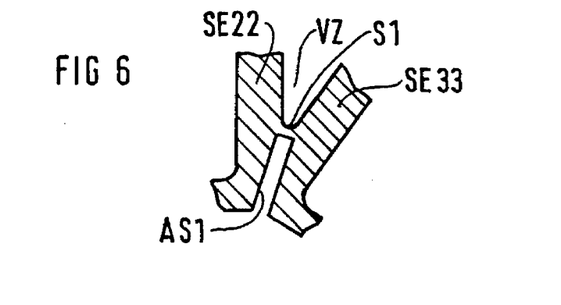
FIG. 6 is an enlarged schematic partial cross section of the mechanical connecting location between two neighboring chamber elements of FIG. 5.

FIG. 5 shows a schematic cross section through an optical cable OC2 having chamber elements KE31 through KE3n that correspond, for example, to the chamber element type KE3 of FIG. 2 in terms of their basic form. Elements transferred unmodified from FIGS. 1–4 are thereby provided with the same reference characters in FIG. 5. The chamber elements KE31 through KE3n are applied in the form of a ring on the outside circumference of the preferably approximately circular central element ZE. The elements are thereby additionally mechanically connected to one another. In FIG. 5, the chamber elements KE31 through KE3n are joined or, respectively, attached to one another to form a chain with, for example, the assistance of connecting webs S1 through Sn-1. The first as well as the last chamber element KE31, KE3n in FIG. 5 are not coupled to one another via a connecting web like the other chamber elements, so that a chain, which is open at the end, is provided. The respective connecting web such as, for example, S1 between the neighboring legs SE22 and SE33 of the chamber elements KE31 and KE32 is preferably provided above their outwardly beveled leg bases. It thereby extends essentially transversely relative to the longitudinal extent of the leg, particularly approximately perpendicularly in FIG. 5 relative to the radially proceeding outside wall such as, for example, AS1 of the respective leg and, thus, approximately in a circumferential direction. FIG. 6 shows an enlarged schematic cross sectional view of this connecting web S1 in detail between the two neighboring legs SE22, SE33 of the chamber elements KE31 and KE32 of FIG. 5. A V-shaped interspace V2 that is inwardly terminated by the connecting web S1 thereby occurs between the two legs SE22, SE33. The respective connecting web is preferably formed by a plastic film strip. In particular, the connecting web is fashioned so that it acts like a film hinge for respectively two neighboring chamber elements, for example, KE31 and KE32. In this way, the chamber elements KE31 through KE3n are attached to one another, on the one hand, as a union and cannot fall apart. On the other hand, respectively two neighboring chamber elements such as, for example, KE31, KE32 can be bent or moved relative to one another at the same time. Their bending line thereby preferably proceeds parallel to the axial cable direction, i.e. perpendicularly relative to the plane of the drawing in FIG. 5, and in the region of their connecting web such as, for example, S1. Manipulation of the chamber elements KE31 through KEn is significantly simplified in this way. In particular, they can be easily arranged at the outside circumference of the central element ZE as a union since they retain their position relative to one another, i.e. are permanently allocated to one another, and thus come to lie in a defined fashion on the outside circumference of the central element ZE. Warehousing of such unions of chamber elements is also likewise simplified since, for example, they cannot get all mixed up as individual elements. As a result of the hinge function of the connecting webs, the chamber elements KE31 through KEn preferably can be placed around the central element ZE as a union, i.e. as an interrelated unit, and can thereby simultaneously adapt to the outside contour of the central element ZE like a length of a chain, i.e. can place themselves annularly around the outside circumference of the central element ZE.

Figure 7:
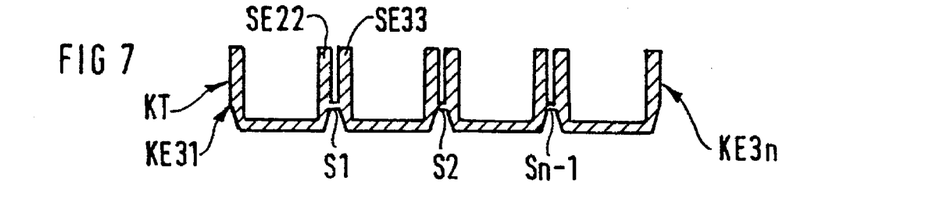
FIG. 7 is a cross sectional view of a union of the chamber elements of FIG. 5 joined together in the form of a straight line.

In FIG. 7, the chamber elements KE31 through KEn of FIG. 5 are joined side-by-side as a union in the form of a straight line and are mechanically coupled to one another via the connecting webs S1 through Sn-1. Given this straight-line arrangement, the adjoining legs such as, for example, SE22, SE33 of two neighboring chamber elements such as, for example KE31, KE32 respectively proceed approximately parallel relative to one another. Their transverse connecting webs, for example, S1 lying at the inside in the chain thereby proceed approximately perpendicularly relative to the longitudinal extent of the legs. Preferably proceeding on the basis of this approximately straight-line arrangement, respectively two neighboring chamber elements can be moved relative to one another via their respective connecting web before being applied onto the central element ZE of FIG. 5, and are movable so that their neighboring leg ends that initially proceed approximately parallel relative to one another hinge away from one another or, respectively, can be spread V-shaped when placed around the central element ZE, so that the annular structure of FIG. 5 derives.

As warranted, the chamber elements KE31 through KE3n can also be connected to one another in a mechanically flexible way in that, for example, they are applied onto a common, flexural foundation such as, for example, a plastic foil or the like.

Other joining means standard in cable technology, such as, for example, in adhesive film or the like can potentially be employed in a similar way.

The statements made regarding FIGS. 5–7 can also be preferably transferred to the other types of inventive chamber element shapes such as, for example, CE1, KE2, in FIG. 1; KE4, KE5, KE6 in FIG. 4; as well as KE7 in FIG. 9.

Figure 8:
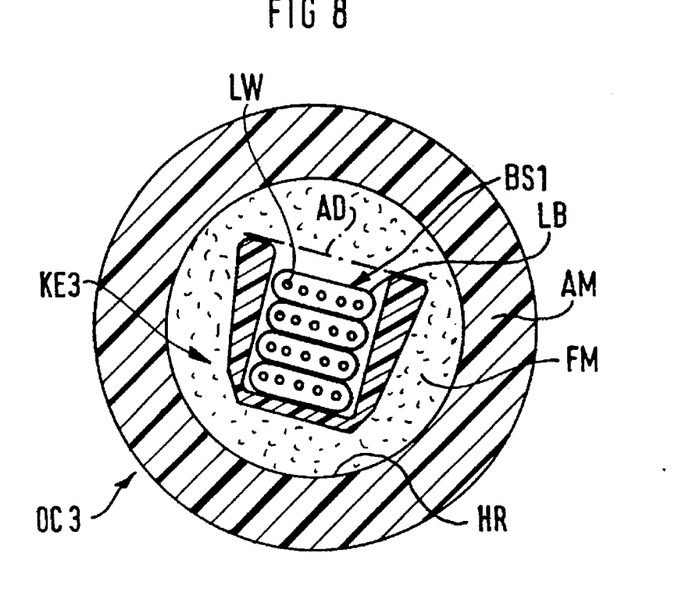
FIG. 8 is a schematic cross sectional view of another exemplary embodiment of the inventive cable having a chamber element of FIG. 2.

FIG. 8 shows a schematic cross section through an additional optical cable OC3 wherein the central elements ZE has been omitted by comparison to the optical cable OC of FIG. 1. Elements transferred unmodified from FIGS. 1–7 are respectively provided with the same reference characters in FIG. 8. In its inside, the optical cable OC3 comprises only a single chamber element of the invention, particularly according to the embodiments of FIGS. 1–7. The transmission element KE3 of FIG. 2 is illustrated by way of example in FIG. 8. The element KE3 is equipped with a light waveguide ribbon stack BS1 that is formed by at least one or more light waveguide ribbons LB stacked on top of one another. The chamber element KE3 is surrounded by an outside cladding AM whereby a preferably approximately circular cavity HR is formed for the chamber element KE3. The chamber element KE3 lies therein, particularly with play. As warranted, the chamber element KE3 can be additionally embedded in filling compound FM, whose material properties are expediently selected so that the chamber element KE3 is additionally cushioned and/or the cable OC3 is render optimally longitudinally water tight. As a result of the inventive cross sectional shape of the respective chamber element KE3 potential transverse compressive forces stressing of the ribbon stack BS1 in the chamber element to an inadmissibly great extent is also largely avoided given this cable, i.e. the ribbon stack remains essentially free of forces due to the high shape stability of the legs of the chamber element KE3 under a multitude of practical conditions. As warranted, a cover element AD can also close the chamber opening of the chamber element KE3 toward the outside for additional mechanical protection of the ribbon stack BS1 and the element AD is indicated only as a dot-dashed line in FIG. 8 for the sake of clarity. Such a covering, for example, can be accomplished with the assistance of a plastic sheath, a retaining helix, a cover lamina or the like. As warranted, it can also be expedient to accommodate additional chamber elements corresponding, for example, to KE3 equipped with ribbon stacks in the outside cladding AM in the same way, so that a plurality of chamber elements are present therein. In addition, it can also be advantageous as warranted to enclose one or more chamber elements of the invention in a quadratic, trapezoidal or otherwise shaped cavity.

Figure 9:
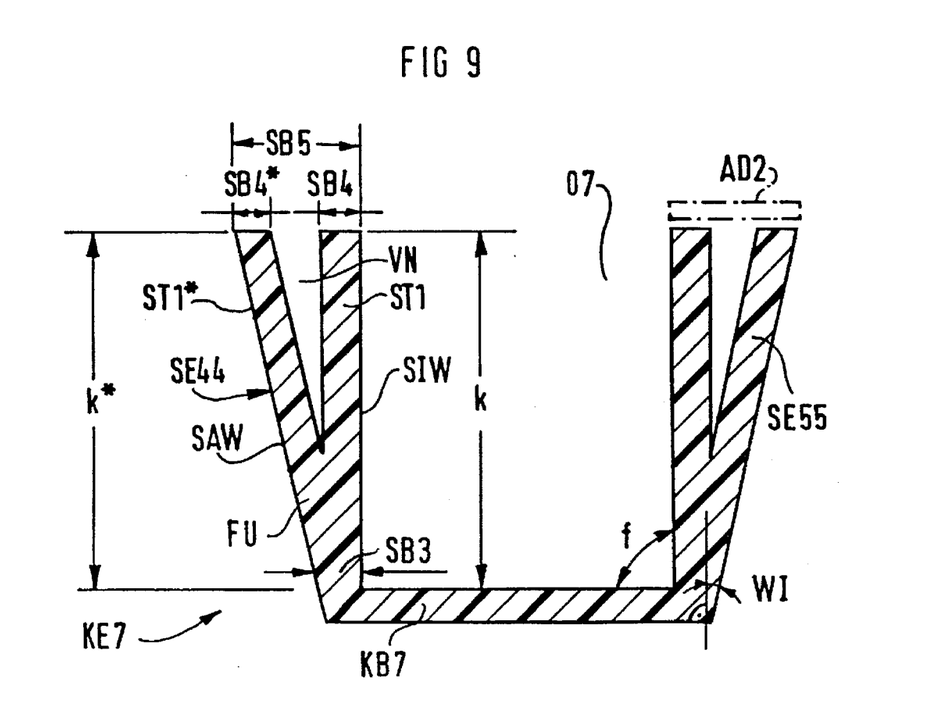
FIG. 9 is a schematic cross sectional view of a still further exemplary embodiment of a chamber element of the present invention.

FIG. 9 shows a schematic cross sectional view through a chamber element KE7 that is modified by comparison to the geometrical cross sectional shapes of the chamber elements of FIGS. 1–8. It comprises an essentially rectangular receptacle chamber O7 outwardly open at one side, for example for an approximately rectangular light waveguide ribbon stack. Its three side walls are formed by a largely planar chamber floor KB7 as well as by two legs or lateral flanges SE44, SE55 that are laterally attached to the chamber floor KB7 and that have their inside wall or surface SIW extending essentially perpendicularly relative to said chamber floor KB7. The legs SE44, SE55 comprise an essentially V-shaped cross sectional leg shape toward the open side of the chamber O7. This V-shape is formed in that the respective leg, for example, SE44 has its outer end divided above a leg foot FU into two webs or leg branches ST1 and ST1* that describe an outwardly open V-channel or V-shaped incision VN between them. This V-channel comprises a cross sectional width that steadily increases as viewed from the inside of the chamber toward the outside. Thus, the leg SE44 has a two-branch or part construction. Proceeding from a common foot region FU, the leg SE44 branches outwardly into the two laterally spreading webs or lateral branches ST1* and ST1. The web ST1 thereby faces toward the inside of the chamber, i.e. it lies at the inside. The web ST1* laterally branched off from the branch ST1, by contrast, and lies at the outside and forms the actual outside leg wall. In particular, the chamber element KE7 is thereby based on the cross sectional shape of the chamber element KE3 of FIG. 2 or KE4 of FIG. 4 as well as on the dimensioning particulars recited thereto as being expedient. The latter chamber elements KE3, KE4 were thereby modified to the effect that the outer ends of their legs were preferably centrally provided with a V-shaped incision or, respectively, clearance such as, for example, VN. Given a chamber element KE7 fashioned in this way, the inside leg wall or surface SIW of the leg foot FU as well as the web ST1 connecting thereto essentially proceed continuously on a straight line as well as perpendicularly relative to the chamber floor KB7. The outside wall or surface SAW of the leg foot FU as well as of the web ST1* adjoining thereto also preferably proceed essentially on a straight line in alignment. When viewed in and of themselves, each of the two webs or leg branches ST1 and ST1* preferably comprise an approximately equal cross sectional width SB or SB4* along their respective longitudinal extent. In particular, the respective outside as well as inside surfaces of each of the leg branches ST1, ST1* proceed approximately parallel relative to one another when viewed in and of themselves. The foot region FU of the leg ST1* or, respectively, ST1 widens from the inside toward the outside in that its outside wall is inclined relative to its inside wall by a spread angle WI. This widening is continued in the outwardly disposed web ST1* that is separated, i.e. spread apart from the web ST1 by the V-channel VN.

The following allocations with respect to the dimensioning of the chamber element KE7 are expedient and were tested with particular success:

$$SB4 \approx SB4\,*) \approx SB3 \text{ or} < SB3$$

and/or $$SB4* \geq SB4$$

and/or $$\alpha_{max} \approx \frac{360°}{2n}$$

and/or $$f \geq 90°$$

and/or $$h \approx 0.9 \cdot h*$$

Thereby also preferably valid are:

SB3≈WS32 (see FIG. 2)

SB5≈WS42 (see FIG. 2)

k≈h (see FIG. 2)

k*≈H-IB1 (see FIG. 2)

In particular, SB5>2·SB3 is selected.

Thereby denoting are:

SB3 is the wall thickness of the respective leg, for example, SE44 in the foot region thereof, for example, FU at the chamber floor, for example, KB7;

SB5 is the total cross sectional width of the respective leg, for example, SE44 at its outer end, i.e. the distance between the inside wall surface SIW of the inwardly disposed leg branch ST1 and the outside wall surface SAW of the outwardly disposed leg branch ST1*;

SB4, SB4* is the respective cross sectional width of the leg branches ST1, ST1*; f is the angle between the respective inside leg wall surface, for example, SIW and the chamber floor KB7;

WI is the angle between the inside leg wall surface SIW and the outside leg wall surface SAW, i.e. the spread angle between the two leg branches ST1, ST1*;

n is the plurality of chamber elements that are arranged around a given central element, for example, ZE in FIG. 1;

k is the inside height, i.e. the chamber depth of the chamber element KE7;

k* is the outside height of respective legs, for example, SE44 (measured without the thickness of the chamber floor).

WI is preferably selected in a range between 7° and 180°, particularly a range of between 7° and 90°, preferably a range between 7° and 22.5° as well as especially preferably around approximately 8°.

For example, the outside wall surface SAW of the leg SE44, particularly the leg branch ST1* thereof aside from the chamber O7 preferably proceeds essentially radially after the stranding of the chamber element KE7. As a result thereof, the respective, outer leg branch, for example, ST1* can be advantageously planarly supported on the leg branch of the neighboring chamber element. The same is true of the leg SE55.

An accumulation of material in the outer leg region is advantageously avoided in the case of the chamber element KE7 of FIG. 7 by the V-shaped clearance VN. At the same time, an adequately supportive vaulting for a great variety of cable structures can nonetheless be constructed with this edge-reinforced chamber elements. This is preferably valid even for an externally small plurality of chamber elements in the cable core. It is thus possible to accommodate preferably only between 2 and 8, particularly between 3 and 5 chamber elements corresponding to KE7 in the cable core around a central element; nonetheless, these elements already form an adequately supportive vault together to resist potential transverse compressive forces. The branching of the respective leg, namely, makes it possible that potential transverse compressive forces can be uniformly load-distributed. A buckling of the leg into the chamber space O7 is largely avoided by this improved load distribution per chamber element, i.e. the chamber space preferably equipped with a light waveguide ribbon stack can be kept practically free of inadmissible forces. The multi-element, branched cross sectional leg shape makes it advantageously possible to manufacture chamber or, respectively, profile elements with especially great edge reinforcement, i.e. overall leg width at the outer leg end, as a result whereof the gaps between respectively two neighboring chamber elements on a subcircle around the central element allocated to them (such as, for example, ZE in FIG. 1 ) can be filled better. As a result thereof, a vault having high resistance to transverse pressure and supporting power for the light waveguides to be introduced can already be formed with very few chamber elements at the outside circumference of a central element, for example, ZE in FIG. 1. In addition, the extrusion of an edge-broadened chamber elements is also particularly simplified.

As warranted, it can also be expedient to provide more than two side branches per leg, i.e. to fashion the respective leg with more multi-elements. It is likewise also possible as warranted to provide material recesses in the leg cross section having a trapezoidal, oval as well as other cross sectional shape. A cable thereby is still also lent high resistance to transverse pressure when only a very few chamber elements are accommodated in the cable core, being particularly stranded onto a central element, for example, ZE of FIG. 1.

In addition, it can also be expedient to close the V-shaped recesses VN of the respective leg such as, for example, SE55 toward the outside as warranted by a covering AD2, so that a V-shaped, closed cavity is formed in the respective leg.

In particular, the legs provided with a cavity can be extruded in a simple way. The seating surface for the cable elements to be subsequently applied is advantageously enlarged by the covering AD2, for example, for at least one further ply of cable elements of the invention, for an armoring, for an outside cladding or for other layers. An undesired pressing of these cable elements into the chamber space O7 is additionally opposed in a supportive fashion in this way.

The chamber elements of the invention corresponding to FIGS. 1–9 can, in particular, also be arranged multi-ply in the cable core as a result of their stability. The respective ply expediently comprises the respectively same type of chamber element. As warranted, however, different types of chamber element can also be selected for successive plies. For example, it is thus especially expedient to provide a first, inner ply of chamber elements according to KE3 of FIG. 2 and to apply a ply of chamber elements according to KE7 of FIG. 9 thereover. Due to their greater edge reinforcement, the latter filled the gaps between two neighboring chamber elements better, with these, of course, lying on a sub-circle having a larger diameter than the inner ply.

Although various minor modifications may be suggested by those versed in the art, it should be understood that we wish to embody within the scope of the patent granted hereon all such modifications as reasonably and properly come within the scope of our contribution to the art.

We claim:

1. In an optical cable having a center element and a plurality of individual elongated chamber elements, the individual chamber elements being stranded in a helical fashion onto the outside circumference of the central element, each chamber element having a chamber for the acceptance of light waveguides, each individual chamber element being fashioned with a cross section of a U-shape which does not form a circular sector shape, each chamber being radially outwardly open and laterally limited by shape-stable legs, the improvement comprising each chamber element having a chamber floor extending between said legs and each leg having a structure with a cross section so that a resultant radial force acting at an outer end face of a respective leg proceeds essentially with the cross section of the leg in an extension of the force toward a cable axis in the center element.

2. In an optical cable according to claim 1, wherein each of the legs has a wall thickness enlarged in an outside region facing away from the chamber floor and increasing up to the outer leg end.

3. In an optical cable according to claim 2, wherein the wall thickness of the legs increases from an inside to the outside according to the relationship $$\alpha = \frac{WS42 - WS32}{h},$$

whereby:

α is the broadening angle between the inside and the outside of the respective leg, WS42 is the respective wall thickness of the legs at the outer leg end, WS32 is the respective wall thickness of the legs at a transition of the outside region to an inside region adjacent the chamber floor, and h is the inside height of the chamber.

4. In an optical cable according to claim 3, wherein the broadening angle α is selected in a range between 0.5° and 7°.

5. In an optical cable according to claim 4, wherein the angle α is between 2° and 5°.

6. In an optical cable according to claim 1, wherein the legs are respectively dimensioned so that the following are valid:

WS42=1.0 through 2.5×WS32,

WS32=1.0 through 1.3×WS22,

WS22=1.0 through 1.5×WS12,

WS42 is the wall thickness of the legs at the respective outer end,

WS32 is the wall thickness of the legs at the transition of the outer region to an inner region adjacent the chamber floor, WS22 is the wall thickness of the legs in an inner region adjacent the chamber floor, and WS12 is the wall thickness of the chamber floor.

7. In an optical cable according to claim 6, wherein:

WS41=1.2 through 2.0×WS32,

SW32=1.0 through 1.1×WS22, and

WS22=1.05 through 1.2×WS12.

8. In an optical cable according to claim 6, wherein the wall thickness WS42 is selected between 0.6 and 1.5 mm, WS32 is selected between 0.4 and 0.75 mm, and WS22 is selected between 0.35 and 0.6 mm, WS12 is selected between 0.25 and 0.55 mm.

9. In an optical cable according to claim 8, wherein WS42 is selected to be between 0.7 and 1.0 mm, WS32 is selected to be between 0.5 and 0.7 mm, and WS22 is selected to be between 0.4 and 0.6 mm.

10. In an optical cable according to claim 1, wherein each of the legs is broadened toward the outside by an angle ($\beta 3$) between the inside wall surface and the cross sectional diagonal.

11. In an optical cable according to claim 10, wherein the angle ($\beta 3$) is selected in a range between 0.5° and 25°.

12. In an optical cable according to claim 11, wherein the angle ($\beta 3$) is between 2° and 12°.

13. In an optical cable according to claim 1, wherein the legs are arranged erect relative to their chamber floor with a respective angle ($\beta 1$) of approximately 90°.

14. In an optical cable according to claim 13, wherein the legs are attached to the chamber floor by an angle ($\beta 1+\beta 2$) in a range of 90° to 98°.

15. In an optical cable according to claim 1, wherein the legs are respectively attached and inclined relative to the chamber floor by an angle ($\beta 1+\beta 2$) greater than 90°.

16. In an optical cable according to claim 15, wherein the legs are respectively attached to their chamber floor by an angle ($\beta 1+\beta 2$) in a range between 90.5° and 95°.

17. In an optical cable according to claim 1, wherein each chamber is fashioned to be wider toward the outside.

18. In an optical cable according to claim 17, wherein each chamber is trapezoidally fashioned.

19. In an optical cable according to claim 1, wherein each chamber element viewed in circumferential direction has the chamber floor pressing against the central element with at most 95% of the width of its chamber floor.

20. In an optical cable according to claim 19, wherein the chamber floor presses against the central element with between 10% and 70% of the width of the chamber floor.

21. In an optical cable according to claim 1, wherein the legs are fashioned of at least two limbs.

22. In an optical cable according to claim 21, wherein the legs of the chamber element comprise a V-shaped clearance at an outer end.

23. In an optical cable according to claim 1, wherein each leg has a wall thickness selected to be greater than a wall thickness of the chamber floor.

24. In an optical cable according to claim 1, wherein each of the legs has an approximately constant wall thickness.

25. In an optical cable according to claim 1, wherein the legs have a beveled inside edge at the outer leg end inwardly directed toward the chamber.

26. In an optical cable according to claim 1, wherein the legs are each respectively rounded off at the outer leg end.

27. In an optical cable according to claim 1, wherein the chamber floor has an upper surface adjacent the chamber and a bottom surface which proceeds approximately tangentially with respect to the outside circumference of the central element as viewed in cross section.

28. In an optical cable according to claim 1, wherein the chamber floor has an upper surface adjacent the chamber and a bottom surface which are curved as viewed in cross section, and the upper surface and bottom surface are matched to the curvature of the central element.

29. In an optical cable according to claim 1, wherein the chamber floor of each chamber element is fashioned vaulted on a bottom surface and has a curvature matched to the curved outside contour of the central element.

30. In an optical cable according to claim 1, wherein each of the legs has a radially proceeding outside wall.

31. In an optical cable according to claim 1, wherein the legs comprise radially proceeding, beveled outside walls in an inner region adjacent the chamber floor.

32. In an optical cable according to claim 1, wherein the light waveguides are combined in the form of a light waveguide ribbon stack.

33. In an optical cable according to claim 1, wherein each chamber element comprises a material having a strength in a transverse direction that approximately corresponds to the strength of the material in a longitudinal direction.

34. In an optical cable according to claim 1, wherein a ratio of transverse strength to longitudinal strength of the material of each chamber element after extrusion is selected between 0.9 through 0.95/1.

35. In an optical cable according to claim 1, wherein a retaining helix positionally secures the chamber elements on the central element.

36. In an optical cable according to claim 1, wherein each of the legs has a radially proceeding inside wall.

37. In an optical cable according to claim 1, wherein the legs have a clearance from one another in an outer region facing away from the chamber floor that is greater than a clearance in an inner region adjacent the chamber floor, and the outer clearance when reduced in size due to later deformation is not smaller than the inner clearance.

38. In an optical cable according to claim 1, wherein each chamber element is dimensioned so that the rated bend point of the chamber element lies on a symmetry axis of the chamber floor.

39. In an optical cable according to claim 1, wherein the legs are designed to be secured against buckling for a maximally allowable buckling force between 10N and 200N.

40. In an optical cable according to claim 1, wherein the legs are designed against inadmissible bending for a maximally allowable bending force between 0.5N and 5N.

41. In an optical cable according to claim 1, wherein each chamber is fashioned approximately rectangularly.

42. In an optical cable according to claim 1, wherein each chamber element is dimensioned so that the following are valid:

$WS42 \geq WS32$ and/or $WS32 \geq WS22$ and/or $WS22 > WS11$, whereby

WS42 is the wall thickness at an outer end in an outer region facing away from the chamber floor, WS32 is the wall thickness of the legs at a transition between an outer region facing away from the chamber floor and an inner region adjacent the chamber floor, WS22 is the wall thickness of the legs in an inner region adjacent the chamber floor, and WS11 is the wall thickness of the chamber floor.

43. In an optical cable according to claim 1, wherein the chamber elements are mechanically connected to one another.

44. In an optical cable according to claim 1, wherein each chamber element is applied on said central element.

45. A method of forming an optical cable having a center element with a plurality of individual elongated chamber elements stranded in a helical fashion onto the outside circumference of the central element, each elongated chamber element having a chamber defined by a chamber floor and two legs extending therefrom, said method comprising providing the outer element and the plurality of chamber elements and stranding the chamber elements on the center element, said step of providing creating each chamber element with a cross section of a U-shape, which does not form a circular sector shape, each chamber being radially outwardly open and limited by shape-stable legs with each of the legs having a structure with a cross section so that a resultant radial force acting on an outer end face of the leg is directed within a cross section of the leg along an imaginary line to the cable axis in the center element.

46. A method according to claim 45, wherein the step of providing includes pre-shaping each chamber element with a larger clearance in an outer region facing away from the chamber floor than an inner region adjacent the chamber floor, said outer clearance while being reduced in size by deformation does not become smaller than the inner clearance of the legs at the inner region.

47. A method according to claim 46, wherein the step of pre-shaping creates legs having an increasing wall thickness as the legs extend away from the chamber floor.

* * * * *